United States Patent Office 2,740,318
Patented Apr. 3, 1956

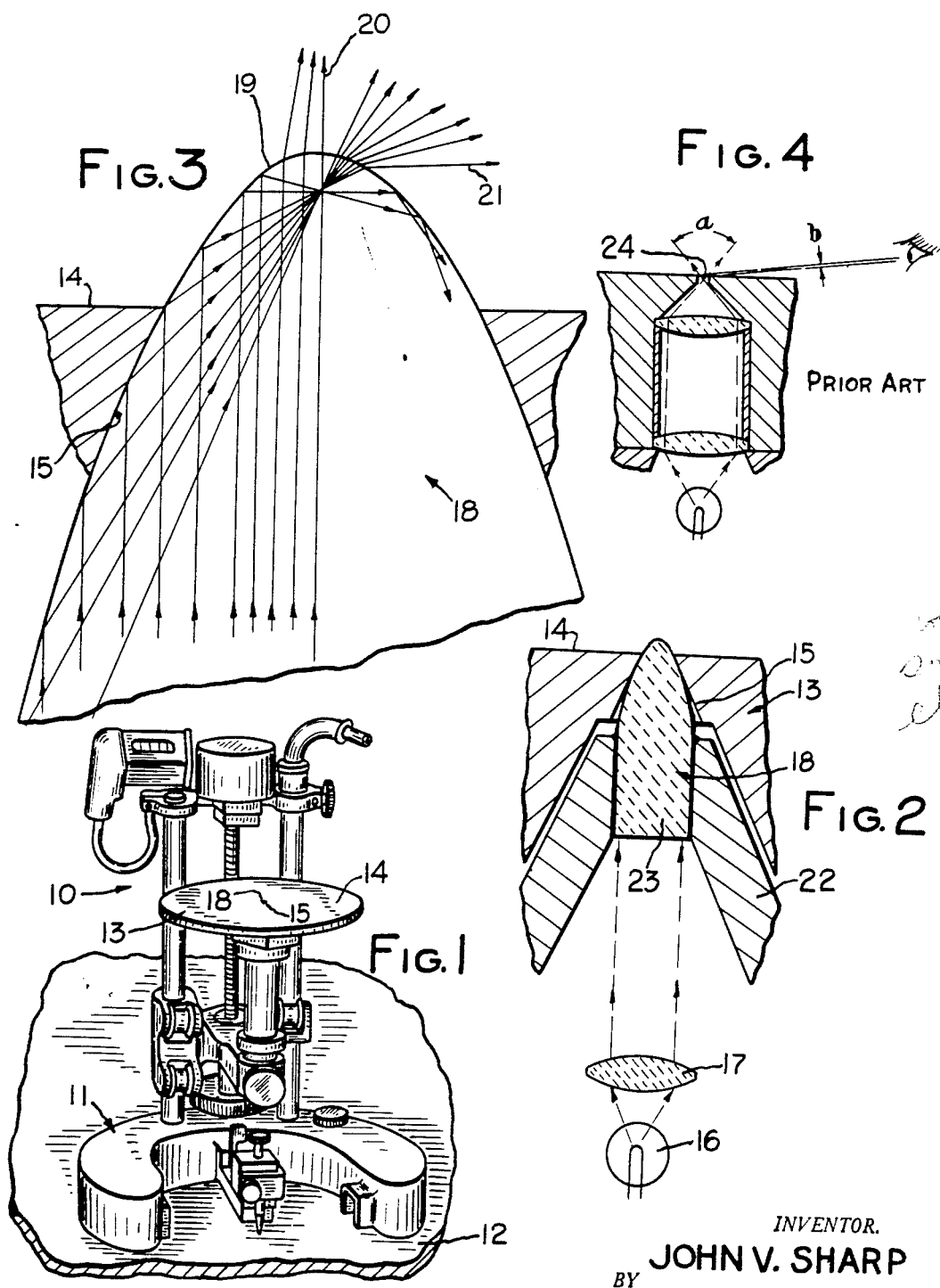

2,740,318
PHOTOGRAMMETRIC TRACING TABLE

John V. Sharp, Penfield, N. Y., assignor to Bausch & Lomb Optical Company, Rochester, N. Y., a corporation of New York Application February 14, 1952, Serial No. 271,569

1 Claim. (Cl. 88—1)

This invention relates to photogrammetric apparatus for making contour maps and more particularly it relates to improvements in tracing tables by which contour lines are drawn upon the map.

In making photogrammetric maps of a terrain with a double projection stereo mapping apparatus, the operator uses a so-called "tracing table" which is equipped with a tracing stylus for marking the map. The tracing table embodies a platen having an upper horizontal surface on which two projectors form a pair of overlapped images of a discrete area of terrain, and these images are viewed stereoscopically by suitable viewing means. A tiny illuminated aperture, sometimes called the "luminous dot," is provided in said surface and the tracing table is moved so that the "luminous dot" is moved from point to point of apparent equal elevation in the stereoscopic space image and thereby causes the stylus to trace a corresponding contour line. When the operator moves the tracing table toward the parts of the map farthest from him, he views the illuminated aperture or "dot" at low angles so that the "dot" becomes attenuated and dim and usually disappears. Some photogrammetrists have sought to remedy this defect by tilting the table temporarily at such an angle that the "dot" reappears, but this expedient involves many disadvantages. The stereo images then become distorted and at best, the illumination of the "dot" is improved only slightly. The cost of manufacturing and servicing such a tilting mechanism is a further hinderance to its adoption.

In view of the foregoing considerations, it is an object of this invention to provide a tracing table having a novel illuminated "luminous dot" therein for photogrammetric mapping apparatus which is simple and inexpensive, easy to manufacture and install and permanently adjusted for good optical performance.

It is a further object to provide such a device wherein the aforesaid "luminous dot" is visible from various angular viewing positions throughout a solid angle of substantially 180 degrees.

A further object is to provide such a device which is rugged and requires a minimum of service after installation.

Further objects and advantages will be apparent in the details of construction and arrangement and combination of parts by reference to the specification below and the accompanying drawing in which:

Fig. 1 is a general perspective view of a photogrammetric tracing table incorporating a preferred form of my invention, Fig. 2 is a fragmentary sectional and partly diagrammatic view of my invention embodied in a tracing table, Fig. 3 is a detailed diagrammatic view of the distribution of light due to my invention, and Fig. 4 is a view showing the prior art.

My invention is incorporated into a tracing table 10 shown in Fig. 1 which may be used in the so-called Multiplex projection system of photogrammetric stereomapping apparatus. The tracing table 10 comprises a frame 11 which is adapted to slidably rest on a map drafting plate that is fragmentarily shown at 12 in Fig. 1, said plate being a part of a stereomapping apparatus, not shown. On the frame 11 is supported in horizontal position a platen 13 having a flat horizontal screen surface 14 whereon two stereo images are projected in the usual manner from a pair of projectors. An aperture 15 is provided in the center of the platen 13 through which light from a lamp 16 is projected by suitable collimating or other lens means 17 shown in Fig. 2.

According to my invention, a transparent light transmitting body 18 is fixed in the aperture 15 to direct the projected light from the lamp substantially throughout a solid angle of at least 180 degrees above the table surface 14. Two characteristics of the light distributing body 18 are especially important in order to achieve such a result; one characteristic being the shape of the polished light refracting surface 19 of the body 18 and the other characteristic being the refractive index of the optical material from which the body 18 is made. In the preferred form of my invention, the body 18 has at its upper end a steeply curved refracting surface 19 which acts as a lens, the shape of the surface being substantially parabolic. The material of the body 18 is sapphire, $Al_2O_3$, with a comparatively high index of refraction of 1.768.

While the uppermost end of body 18 is shown as having a surface of revolution 19 which is paraboloidal in form, it is to be understood that the polished surface 19 may have other forms or shapes such as ellipsoidal or spherical, or combinations thereof, for example. It is essential that the uppermost end of body 18 be formed as a solid whose outer surface is a surface of revolution so that it is substantially symmetrical to the vertical axis of aperture 15. The body 18 may be formed of any suitable transparent material having a suitable refractive index. The surface 19 and the refractive index of the body should be such that their combined effect will produce the desired distribution of emitted light throughout a solid angle of about 180 degrees. In one successful device, the diameter of aperture 15, at the locus of surface 14, is about .004 inch although this dimension may, of course, be altered without departing from the invention. The upper end of the body 18 should project above the surface 14 by an amount which is equal to at least one-fourth of the radius of but is not greater than the diameter of the aperture 15 at the locus of surface 14. The surface 19 may be so formed that the intensity of the emitted light is different for different angular zones or it may be formed so that the intensity of light is substantially uniform for all zones.

In Fig. 3, light rays have been traced through the refractive surface 19 of the lens body 18 including the axial ray 20, the boundary ray 21 and some interpositioned rays to show the angular extent of the light distribution. Light rays which are incident on the refracting surface 19 below the boundary ray 21 are strongly reflected internally so that the visible light is much weaker in this low region of the curved surface 19. The lens body 18 may be held in position in the aperture 15 by any desirable means such as the conical holder 22 within which the cylindrical end 23 of body 18 is cemented, as shown in Fig. 2. The holder 22 is preferably attached by adjustable securing means, not shown, to the platen 13.

Comparing my invention with the prior art, it will be understood by reference to Fig. 4 that no light may be seen in the aperture 24 when viewing at low angles since only the back side of the aperture is illuminated with reflected light and the shape of the aperture appears as a very flat ellipse $b$. The direct light is distributed within a maximum solid angle $a$ as shown. Furthermore, the size of the aperture 15 is usually only about (.004")

four thousandths of an inch in diameter, so that this very small object is much more difficult to see when viewed at any considerable obliquity. By the use of my invention, the luminous body 18 provides a sizeable area to be viewed even from low angles which together with the light distributing characteristics of said body provide a luminous mark of substantially constant apparent brightness for all viewing angles. Another consideration regarding the superiority of my invention is the fact that the light is strongly concentrated at the protruding part of the luminous body, and the shape of the refracting surface and the refractive index of the optical material of the body 18 may be varied to distribute the emergent light strongly into certain angular zones if needed or these two properties of the body may be chosen so as to provide a strictly uniform distribution of light.

It will be obvious to those skilled in the art that other forms of my invention are possible, and I do not wish to be restricted to the precise form shown since changes and substitutions and rearrangement of the parts may be made therein without departing from the spirit of the claim as appended herebelow.

I claim:

In a tracing table for tracing contour lines on a mapping surface, said table having a horizontal surface whereon corresponding points in a pair of stereo images of the terrain to be mapped are viewed stereoscopically, said surface having an aperture therethrough, a source of light fixed in said table beneath said surface and projection means for directing light from the source through said aperture, the combination of a light transmitting and refracting optical body fixed in said aperture so as to receive light from said source, a portion of said body projecting above said surface and having a substantially paraboloidal shape so that the light which the body receives from said source is distributed throughout a solid angle of at least 180 degrees whereby said light is distributed for good visibility when viewed from any angular position above said surface.

References Cited in the file of this patent

UNITED STATES PATENTS

| | | |
|---|---|---|
| 1,265,386 | Richards | May 7, 1918 |
| 2,035,998 | Thompson | Mar. 31, 1936 |
| 2,363,643 | Cook | Nov. 28, 1944 |
| 2,589,569 | Peter et al. | Mar. 18, 1952 |
| 2,676,425 | Bonnanno | Apr. 27, 1954 |

FOREIGN PATENTS

| | | |
|---|---|---|
| 26,060 | Great Britain | 1896 |